United States Patent [19]

Kobori

[11] Patent Number: 4,984,226
[45] Date of Patent: Jan. 8, 1991

[54] MAGNETOPTIC HEAD FOR RECORDING/ERASING INFORMATION USING A CYLINDRICAL HOLLOW PERMANENT MAGNET

[75] Inventor: Hiromichi Kobori, Yokohama, Japan
[73] Assignee: Kabushiki Kaisha Toshiba, Kawasaki, Japan
[21] Appl. No.: 402,760
[22] Filed: Sep. 5, 1989

Related U.S. Application Data

[62] Division of Ser. No. 77,851, Jul. 27, 1987, Pat. No. 4,868,802.

[30] Foreign Application Priority Data

Jul. 28, 1986 [JP] Japan .................... 61-175585
Jul. 28, 1986 [JP] Japan .................... 61-175586
Feb. 13, 1987 [JP] Japan .................... 62-29695

[51] Int. Cl.$^5$ .................... G11B 11/04; G11B 11/14
[52] U.S. Cl. .................... 369/13; 360/114; 369/44.22
[58] Field of Search .................... 369/13, 44.22, 44.15, 369/44.16, 32; 350/247, 255, 242; 360/59, 114; 365/122

[56] References Cited

U.S. PATENT DOCUMENTS 4,747,668 5/1988 Meyer et al. .................... 350/247
4,759,005 7/1988 Kasahara .................... 369/45

FOREIGN PATENT DOCUMENTS 57-71529 5/1982 Japan .................... 350/247
61-96540 5/1986 Japan .................... 360/114

Primary Examiner—Stuart S. Levy
Assistant Examiner—Hoa Nguyen
Attorney, Agent, or Firm—Foley & Lardner, Schwartz, Jeffery, Schwaab, Mack, Blumenthal & Evans

[57] ABSTRACT

To reduce the size and thickness of a magnetooptic head, a single hollow cylindrical permanent magnet magnetized in the radial direction thereof is arranged at the center of a condenser lens. The axial component of the magnetic flux is available for an external magnetic field required for recording and erasing operations, while the radial component of the magnetic flux is available for a magnetic field required for focusing operation in cooperation with a cylindrical focusing coil arranged coaxially with the cylindrical magnet.

1 Claim, 15 Drawing Sheets

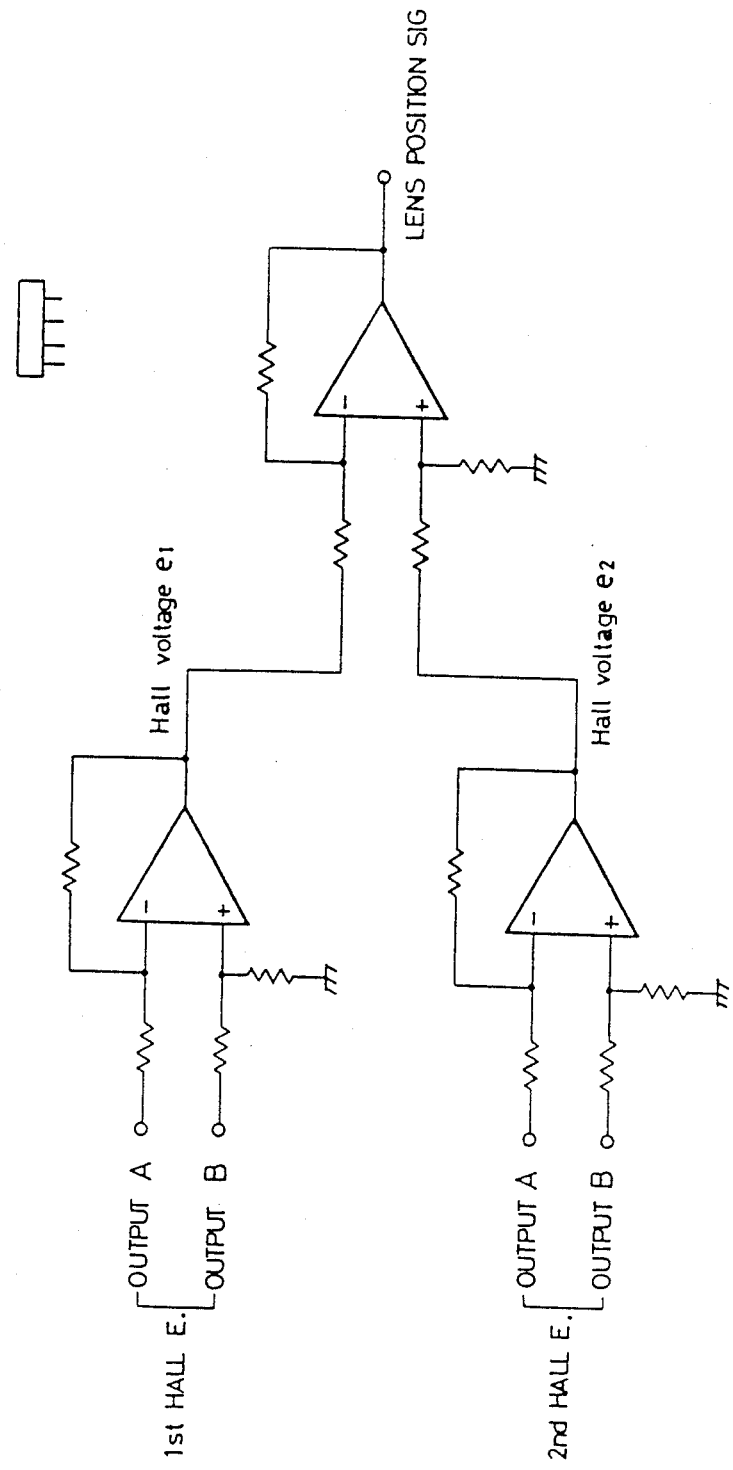

MAGNETOPTIC HEAD FOR RECORDING/ERASING INFORMATION USING A CYLINDRICAL HOLLOW PERMANENT MAGNET

This application is a division of application Ser. No. 07/077,851, filed July 27, 1987 now U.S. Pat. No. 4,868,802.

BACKGROUND OF THE INVENTION

1. Field of the Invention

The present invention relates to a magnetooptic head which can record, read, and erase information on or from a magnetooptic disk.

2. Description of the Prior Art

So far, various optical disk memories have been developed as memory units of higher density and large capacitance. In parallel to the research and development of the disks, optical disk drives have been developed, of course. However, the higher density and larger capacitance of the disk memory are greatly dependent upon the optical head memory. In other words, it is no exaggeration to say that the head decides the value of the memory unit.

The optical head is disclosed in some Patent Applications. For instance, Japanese published Unexamined Patent Appli. (Kokai) No. 58-12145 discloses a head in which a permanent magnet is fixed to a condenser lens and coils are mounted on a fixed base near the permanent magnet to drive the magnet in at least two directions for providing tracking and focusing control, independently. Further, Japanese Patent disclosure (Kokai) No. 59-221839 discloses a head in which coils are bonded to a condenser lens and a permanent magnet is fixed to a fixed base to drive the coils in at least two directions for providing tracking and focusing control, independently.

In the above-mentioned write-once type optical disk, information once written is not erasable or overwritable. However, it is of course desirable to erase unnecessary information from a disk to effectively utilize the optical disk.

Therefore, an overwritable magnetooptic disk memory has been developed and highlighted. The disk memory of this type will be described hereinbelow in brief.

To record information signals on the magnetooptic disk, a 1 μm-dia. laser spot light is focused locally on the disk under an external magnetic field of 500 Oe or less to raise local temperature on the magnetic film and thereby to change the local magnetization direction in parallel to the external magnetic field. In this case; a pit of a 0.6 to 1 μm width and a 1 to 2 μm length is formed on the disk. To erase information signals from the disk, another external magnetic field opposite to the recording external field in direction is applied to the disk. To read information signals from the disk, the disk is irradiated with a linearly polarized laser beam to detect a difference in polarization direction of reflected or transmitted light between areas at which magnetization direction is inversed and those at which not inversed.

As described above, in order to record, read and erase information to or from the disk, external magnetic fields are necessary in addition to a laser beam for locally heating the magnetic film.

FIG. 1(A) shows an example of prior-art external magnetic field generating means disclosed in the two already-mentioned Japanese patent Applications, in which an optical head OH and a permanent magnet PM (or an electromagnet) are disposed on both sides of a disk D in opposing positional relationship to each other.

In the above arrangement, it is desirable that the intensity of the external magnetic field is substantially constant in both information recording and erasing operations. However, whenever the disk rotates, since the disk is subjected to dynamic axial runout, the distance between the disk D and the permanent magnet PM changes, so that the intensity of the external magnetic field on the disk fluctuates.

The fluctuations of the external magnetic field intensity cause variations in recorded pit size or in erased track width, thus resulting in drawbacks such that information signal quality, that is, disk drive reliability is deteriorated.

To overcome the above fluctuations, although it is possible to increase the distance between the disk and the external magnetic field generating means, the generating means may become large in size and another problem with heat generation may arise in the case of an electromagent.

To overcome the above-mentioned problem, Japanese Published Unexamined Patent Applic. (Kokai) No. 61-96540 discloses a head including a movable magnet as shown in FIG. 1(B). In this head, a cylindrical magnet MG is fixed to a condenser lens CL for focusing a laser beam LB onto a surface of a disk D, coaxially with the condenser lens CL. The magnet MG is adjustably moved to or away from the disk D by a focusing coil FC, together with the condenser lens.

In the above-mentioned prior art head, however, there exists another problem in that another tracking coil and another tracking magnet should be arranged within the same head, thus resulting in a relatively complicated mechanism, an increase in size and thickness of the head, an interference in magnetic field between focusing magnet and tracking magnet.

In the optical disk device of large capacity and high density, it is indispensable to implement focusing control and tracking control for the condenser lens. For doing this, a tracking guide groove called pregroove is formed on the disk in the concentric or spiral fashion with a track pitch of about 1.6 to 2 μm. The condenser lens is controllably driven along the pregroove (in the tracking direction) on the basis of a tracking signal detected from the groove.

In the above-mentioned track access operation of the laser beam, the head is usually controlled in accordance with two, coarse and fine, operations. That is, when the access distance for tracking control is 50 to 60 μm or more, the head is coarsely moved by an external actuator such as a linear motor; while when the access distance is 50 to 60 μm or less, only the condenser lens is finely moved by an internal actuator housed within the head.

In the coarse track access operation of the above two-stage servo tracking system, the condenser lens is locked at a predetermined (central) position within the head by passing a current through the tracking coils in order to prevent vibrations of the condenser lens caused when the head is stopped near a designated track and to enter the succeeding fine track access operation immediately. On the other hand, in the fine tracking operation, the condenser lens is located at the central position within the head. In summary, the tracking operation can be achieved by a fine tracking actuator provided inside the head and a coarse linear actuator provided outside the head in combination for providing a high speed track access operation. Therefore, it is necessary to accurately detect the position of the condenser lens relative to the head especially for two stage tracking servosystem.

To detect the condenser lens position, conventionally two, reflected light and transmitted light, detection methods have been used.

FIG. 1(C) shows a reflected light detection method, by which light emitted from a light emitting diode LED is guided through a lens LS, reflected by a mirror M attached on a holder of a condenser lens CL, and then received by a two-element photodetector PD to detect unbalance between the two. In this case, the position of the condenser lens CL can be detected on the basis of a differential output between two output signals generated from the two-element photodetector PD.

FIG. 1(D) shows a transmitted light detection method, by which light emitted from an LED is guided through a lens LS, transmitted through a slit SL and then received by a two-element photodetector PD to detect an unbalance between the two caused when the slit SL moves.

In the prior-art condenser lens position detecting apparatus, there exist various drawbacks such that optical elements are required to be located at accurate positions relative to the lens holder; the number of parts is large; the movable condenser lens is unbalanced in weight because some additional elements are attached onto the lens holder, thus resulting in an inclination of the lens actuator or unstability thereof.

SUMMARY OF THE INVENTION

With these problems in mind, therefore, it is the primary object of the present invention to provide a magnetooptic head small in size, thin in thickness and high in information signal reliability.

To achieve the above-mentioned object, a magnetooptic head for recording/erasing information on/from a recording medium by irradiating the recording medium with a laser beam within magnetic field according to the present invention comprises: (a) condenser lens unit for focusing the beam on the recording medium; (b) magnetic field generating unit fixedly arranged outside of the condenser lens unit, for generating a recording/erasing external magnetic field in an axial direction of said condenser lens unit and focusing and tracking actuator magnetic fields in a radial direction of said condenser lens means; (c) at least two focusing coil unit arranged within the radial-direction magnetic field in symmetrical positional relationship with respect to a center of said condenser lens unit, for moving the condenser lens unit and said magnetic field generating unit together in an axial direction of the recording medium, for providing an automatic focusing servo operation of the laser beam; (d) at least two tracking coil unit also arranged within the radial-direction magnetic field in symmetrical positional relationship with respect to the center of said condenser lens unit, for moving the condenser lens unit and said magnetic field generating unit together in a radial direction of the recording medium, for providing a tracking servo operation of the laser beam; and (e) elastic unit for supporting the condenser lens unit and said magnetic field generating unit together so as to be, movable relative to said focusing and tracking coil unit in the axial and radial directions of said recording medium.

Further, it is preferable to further provide the head with at least one magnetic field intensity detecting unit arranged near said magnetic field generating unit, for detecting direction and displacement of said magnetic field generating unit relative to said focusing and tracking coil unit to lock said condenser lens unit and to move said head itself for coarse track access operation.

The magnet field generating means is a permanent magnet which can apply an external recording or erasing magnetic field, focusing and tracking operation magnetic fields, and condenser lens position detecting magnetic field, all together, thus reducing the size and thickness of the head and improving the reliability of the head without being subjected to magnetic field interference.

BRIEF DESCRIPTION OF THE DRAWINGS

The features and advantages of the magnetooptic head according to the present invention will be more clearly appreciated from the following description of the preferred embodiments of the invention taken in conjunction with the accompanying drawings in which like reference numerals designate the same or similar elements or sections throughout the FIGURES thereof and in which:

FIG. 9(A) is an illustration showing a Hall element;

FIG. 9(B) is a differential circuit;

DETAILED DESCRIPTION OF THE PREFERRED EMBODIMENTS

Figure 1A:
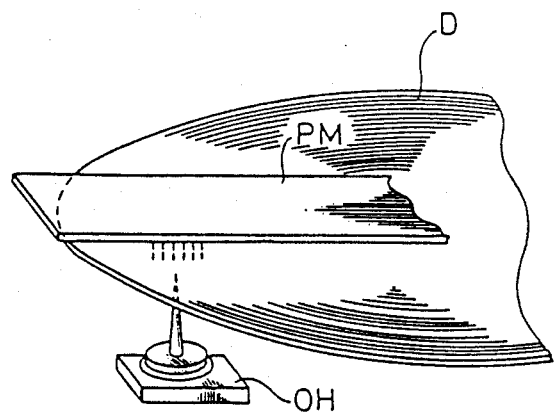
FIG. 1(A) is a perspective view showing a prior-art optical head and a permanent magnet.
Figure 1B:
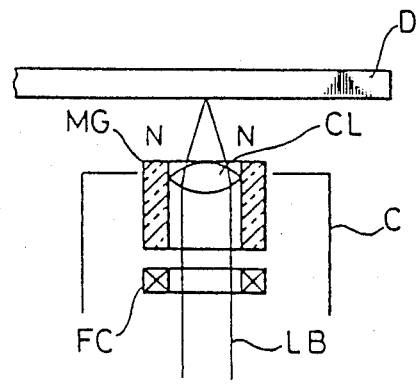
FIG. 1(B) is a diagrammatical view showing another prior-art optical head.
Figure 1C:
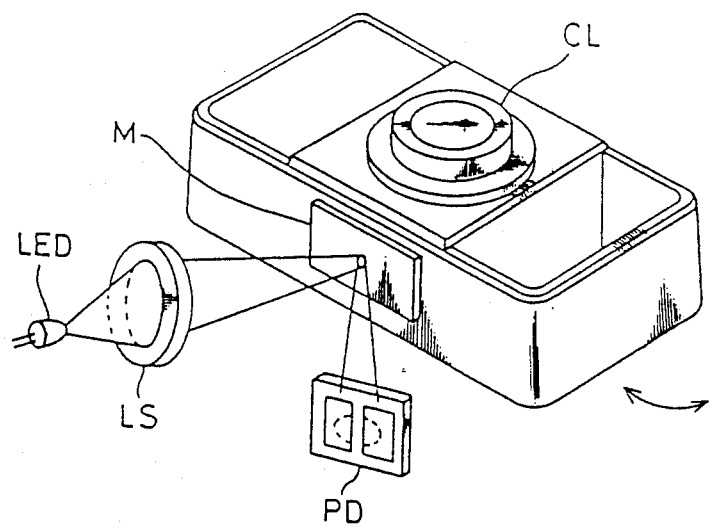
FIG. 1(C) is a perspective view showing a prior-art method of detecting a head position.
Figure 1D:
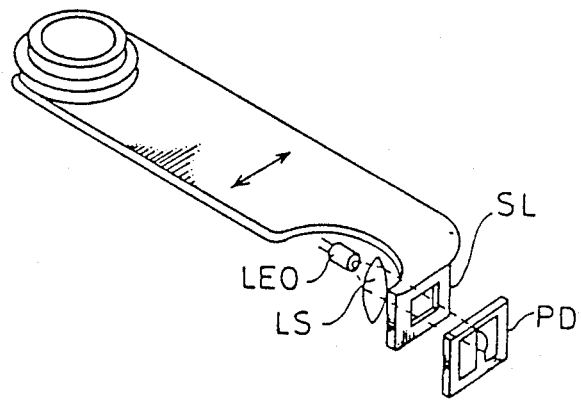
FIG. 1(D) is a perspective view showing another prior-art method of detecting a head position.
Figure 2A:
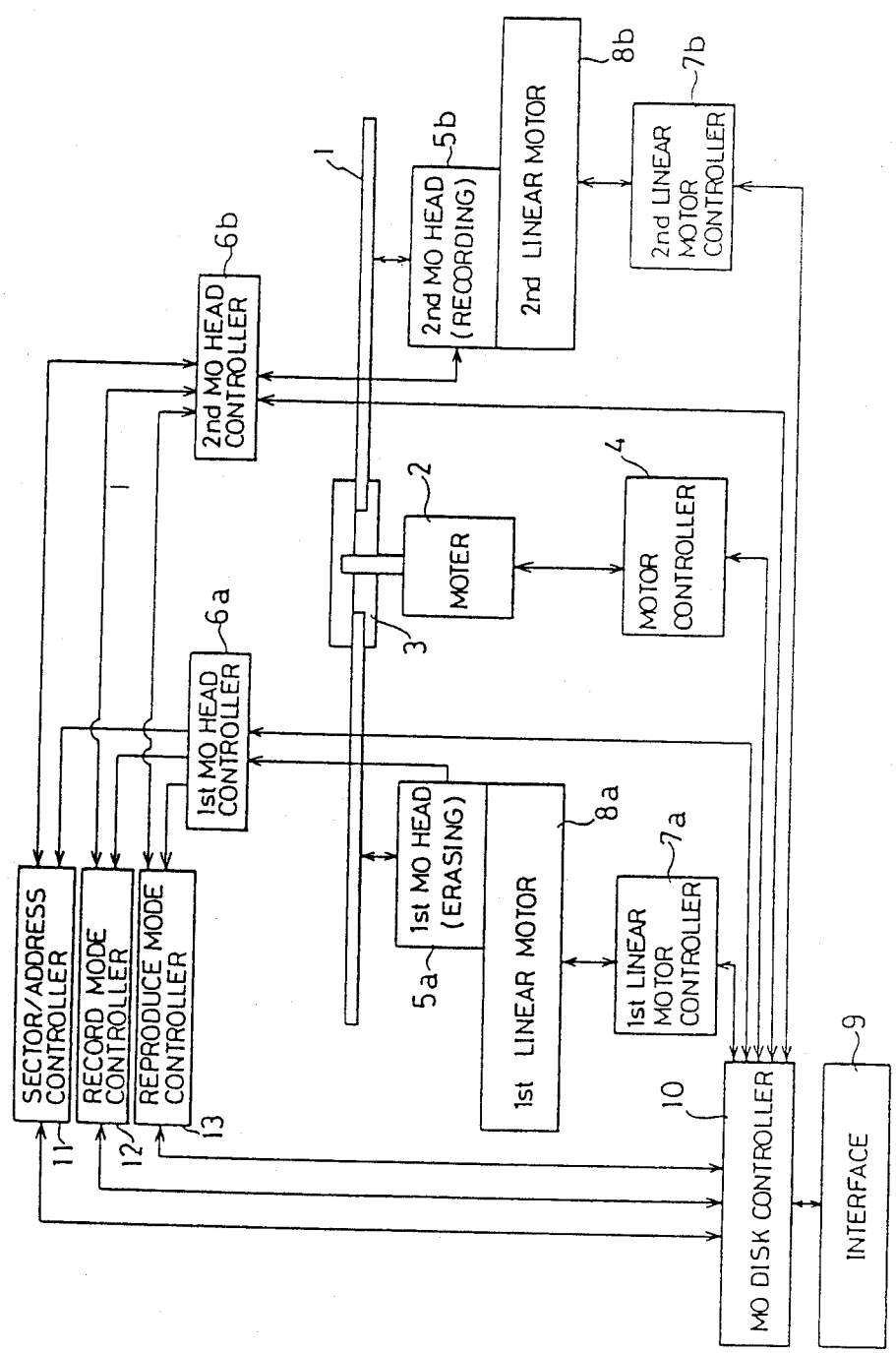
FIG. 2(A) is a block diagram showing a head driving system of the magnetooptic head according to the present invention.

FIG. 2(A) is a block diagram showing a magnetooptic disk drive including magnetooptic heads as an embodiment of the present invention, with a magnetooptic disk as a recording medium.

A magnetooptic disk (referred to as a disk) 1 is mounted on a turntable 3 driven by a motor 2 rotating at a constant rotational speed under the control of a motor controller 4. The numeral 5a denotes a first (erasing) magnetooptic head, and 56 denotes a second (recording) magnetooptic head. Each of these heads comprises an optical devices including a laser diode, optical sensors, various optical elements (condenser lens) etc., to irradiate the disk 1 with a laser beam for detection of tracking control signal, focusing control signal and readout information signal; and a permanent magnet for generating external magnetic field required for recording and erasing operations, all elements moving together with a condenser lens. Further, as already described, the direction of external magnetic field generated by the first head 5a is opposite to that of the external magnetic field generated by the second head 5b on the magnetooptic disk 1. These two heads 5a and 5b are finely controlled by first and second head controllers 6a and 6b, independently, and additionally coarsely by first and second linear motors 8a and 8b controlled by first and second linear motor controllers 7a and 7b, independently, along disk radial direction.

The apparatus shown in FIG. 2A is provided with recording mode and readout mode. In operation of recording or readout mode, a record/readout mode designation signal, a record/readout selector address, a record/readout bit number, record information signals, etc. are transferred between an external system (not shown) and a magnetooptic disk controller 10 via an interface 9. A sector address controller 11 controls the head 5a or 5b so as to access a designated sector. A record mode controller 12 or a readout mode controller 13 executes each designated mode in unit of sector.

Figure 2B:
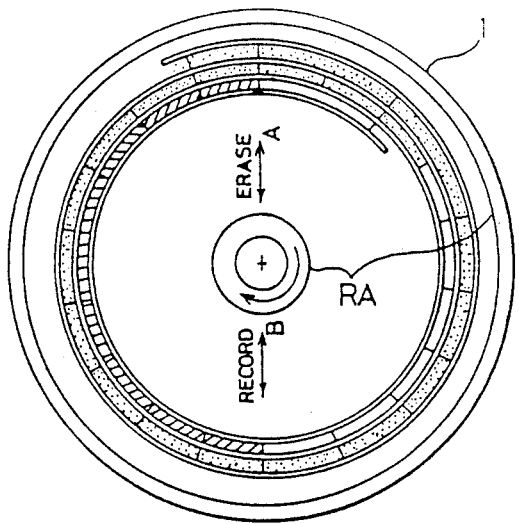
FIG. 2(B) is an illustration for assistance in explaining the erasing and recording operations of the head according to the present invention.

With reference to FIG. 2(B), the overwrite operation of the magnetooptic head will be described. An information signal recording area RA of the disk 1 extends from near the center thereof in spiral fashion, and further each annular track area is divided into N sectors. Sector addresses are determined in sequence beginning from the innermost circumference track to the outermost circumference track.

The first erasing magnetooptic head 5a moves in the radial direction of the disk 1 as shown by the arrow A, while the second recording magnetooptic head 5b moves in the radial direction of the disk 1 as shown by arrow B.

The two heads are disposed in symmetrical positional relationship with respect to the center of the disk, and erases and then overwrites information from and to the disk 1. In more detail, the two heads make access to a track to be overwritten in response to a sector address When the disk 1 rotates clockwise as shown in FIG. 2(B), the first erasing head 5a first erases some divided sector areas. Thereafter, when the erased sector area reaches the second recording head 5b, the head 5b overwrites new information on the erased area.

Since two heads 5a and 5b are used for overwriting information, the recording time can be reduced by half, as compared with the case where information is overwritten by operating a single head, thus improving the throughput time of the disk drive.

Figure 3A:
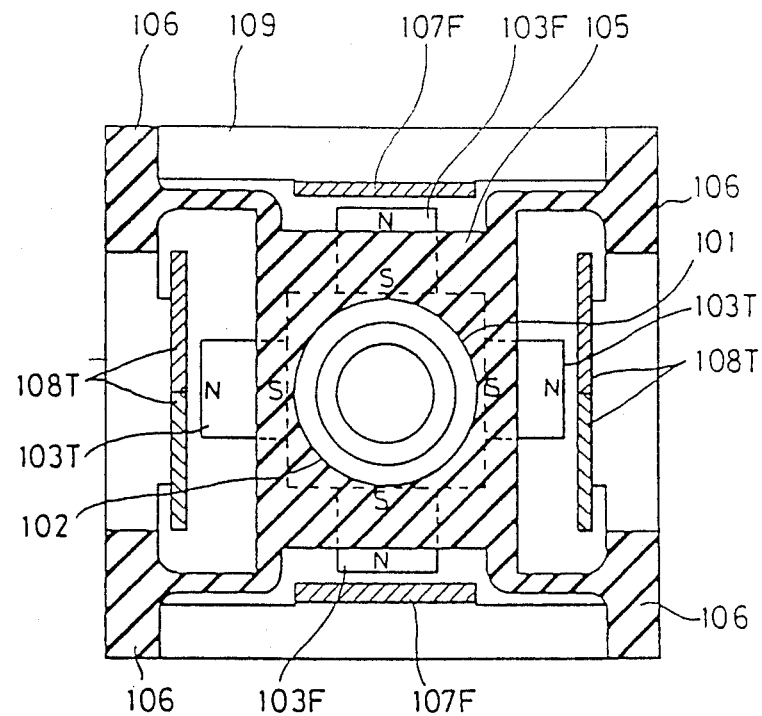
FIG. 3(A) is a top view showing a first embodiment of the head of the present invention.
Figure 3B:
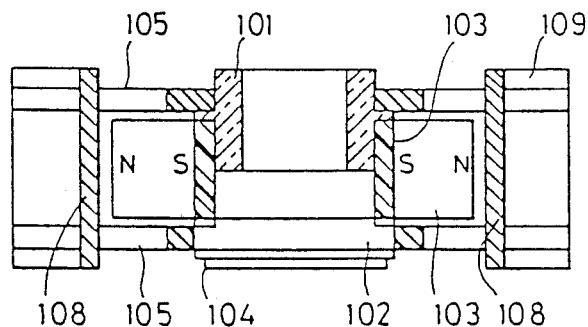
FIG. 3(B) is a side view showing the head shown in FIG. 3(A)

FIG. 3(A) is a top view showing first embodiment of the magnetooptic head according to the present invention, and FIG. 3(B) is a side view showing the same.

A laser beam generated from a laser diode (not shown) is focused on the disk as a spot through a condenser lens 101 supported by a condenser lens holder 102 made of a non-magnetic material such as resin. Four permanent magnets 103 are fixed to four side surfaces of the condenser lens holder 102, respectively, so as to be movable together with the condenser lens 101.

One of the features of the present invention lies in the above four magnets 103 so mounted that the same four magnetic pole surfaces (South pole in FIG. 3) are confronting each other. The function of this permanent magnet arrangement is to apply an external magnetic field on a disk to record or erase information to or from the disk and to implement both focusing and tracking operations of a laser beam irradiated through the condenser lens 101, as described later in more detail.

The permanent magnet 103 is made of a magnetic material of NdFeB group with a maximum energy product (BH)max=41MGOe and a reversible temperature coefficient $-0.071\%/^\circ$ C. The component of the magnet can be classified into three categories, as ferromagnetic Fe rich-phase of $Nd_2Fe_{14}B$ pyramidal quadratic (tetragonal) system; non-ferromagnetic R rich-phase of cubic system including 90 wt. % of substituent R (rare-earth element including yttrium Y) such as $Nd_{97YFe}$, $Nd_{ps}$, Fe; non-ferromagnetic B (Boron) rich-phase of pyramidal quadratic system such as $Nd_2Fe_7B_6$ including oxide.

Under the condenser lens 101, a counterweight 104 is attached to counterbalance the weight of the condenser lens 101. The condenser lens holder 102 is movably supported by two upper and lower rubber suspensions 105 each having four leg portions 106 fixed to a frame 109. Further, a pair of focusing coils 107F are fixed to the frame 109 at such positions as to each come close to the outer flat surface of each focusing magnet 103F, extending in parallel to the outer flat surface thereof. Furthermore, a pair of two tracking coils 108T are fixed to the frame 109 at such position as to each come close to the outer flat surface of each tracking magnet 103T, also extending in parallel to the outer flat surface thereof.

Figure 4:
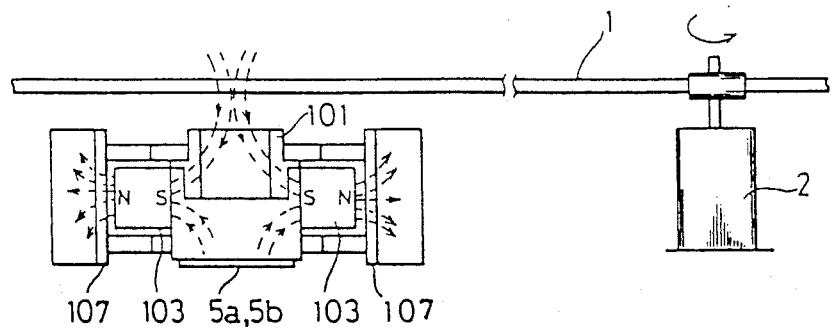
FIG. 4(A) is a view for assistance in explaining the operation of the head of the present invention.

With reference to FIG. 4, the feature of the present invention such that the head 5a or 5b is driven in the axial direction for focusing control and in the radial direction for tracking control will be described hereinbelow, while applying a constant external magnetic field to the disk for providing erasing or recording operation.

In operation, the disk 1 is rotated in a predetermined direction by the motor 2. The head 5a or 5b should be positioned a constant distance away from the surface of the disk 1 to focus the laser beam guided through the condenser lens 101 mounted on the head to the disk. For doing this, focusing current is passed through the focusing coils 107F to generate a mutual magnetic force generated between the two permanent magnets 103F and the two focusing coils 107F in accordance with Fleming's left-hand rule, so that the condenser lens 101 is moved in the axial direction thereof for focusing control operation against a elastic force of the two rubber suspensions 105.

On the other hand, the head 5a or 5b should be located at a designated radial position of the disk to track a designated sector address on the basis of the laser beam guided toward the disk through the condenser lens 101 mounted on the head. For doing this, tracking current is passed through the four tracking coils 108T to generate a mutual magnetic force generated between the two permanent tracking magnets 103T and the four tracking coils 108T in accordance with the same Fleming's rule, so that the condenser lens 101 is moved in the radial direction thereof for tracking control operation against another elastic force of the two rubber suspensions 105.

In addition to the above focusing and tracking operations, the four permanent magnets 103F and 103T serve to apply an external magnetic field as shown by dashed lines in FIG. 4 onto the disk 1 for permitting information recording or erasing operation. In other words, these four permanent magnets 103 are used for providing three magnetic fields of focusing, tracking, and recording or erasing operations. For these three operations, four permanent magnets 103 are arranged in such a way that the same magnet poles thereof are confronting each other and the same size magnets are spaced at regular angular intervals around the condenser lens 101, therefore, the magnetic flux flows from the four outer flat surfaces of the four magnets, extending radially outward of the condenser lens 101 and returning axially inward thereof, to the four inner flat surfaces thereof, as shown in FIG. 4.

In the head of the present invention, an intensity of the external magnetic field generated from the four magnets 103 is previously so determined as to be sufficient for information recording and erasing operation under the condition that the laser beam from the head 5a or 5b is focused at a predetermined track of the disk 1. In the prior art head, the movable permanent magnets fixed with the condenser lens serve only to move the condenser lens relative to the fixed coils, and an additional permanent magnet is provided for applying an external magnetic field necessary for information recording and erasing operations. Therefore, when dynamic axial runout occurs in the disk, the external magnetic field inevitably fluctuates.

On the other hand, in the present embodiment, since the permanent magnets fixed to the condenser lens 101 are used in common for applying an external magnetic field to the disk, the intensity of field required for recording and erasing operation can automatically be kept constant (e.g. 400 Oe), even if dynamic axial runout occurs in the disk rotation, as long as the focusing operation is automatically being controlled. Therefore, it is possible to record or erase information stably to or from the disk.

Further, since the external magnetic field generating unit is incorporated in the lens actuator, the magnetooptic disk drive can be minimized in size or thickness and therefore the track access time can be reduced because the head weight can be reduced markedly. Further, a reduction in weight of the disk drive serves to further increase the access speed.

In a certain test using the head of the present invention, when a 1 MHz 50% duty signal was recorded on a multi-layer TbCo disk under the conditions that the recording laser power is 5 mW; the disk rotational speed is 1,200 rpm; and the readout laser power is 1.5 mW, the C/N (carrier-to-noise ratio) (i.e. S/N ratio within a predetermined bandwidth) is 50 dB or more for the 30 KHz bandwidth.

Further, in FIGS. 3 and 4, the same south magnetic poles are confronting each other. However, it is of course possible to arrange the magnets so that the same north poles are confronted each other.

Figure 5A:
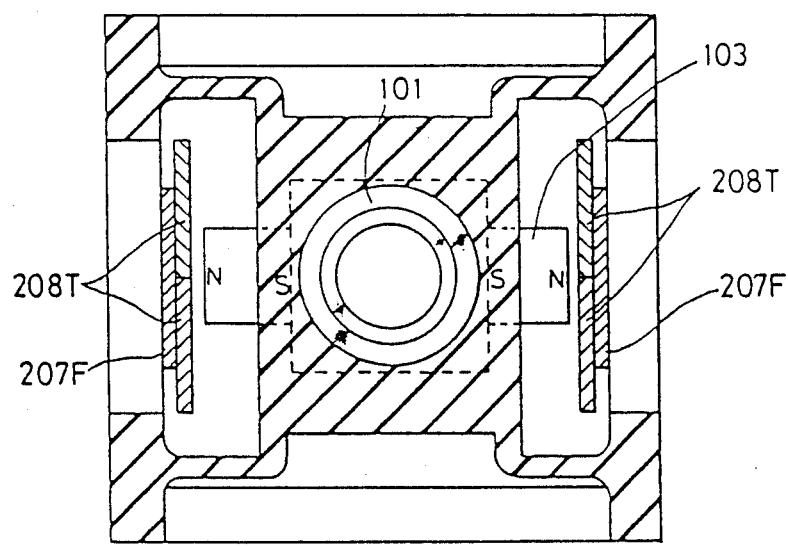
FIG. 5(A) is a top view showing a first modification of the first embodiment.
Figure 5B:
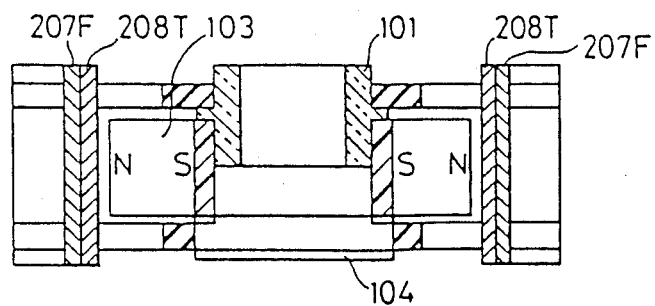
FIG. 5(B) is a side view showing the head shown in FIG. 5(A)

FIGS. 5(A) and (B) show a first modification of the first embodiment shown in FIG. 3. In these drawings, only two permanent magnets 103 are arranged close to the condenser lens 101. The intensity of the magnetic field generated by the permanent magnets 103 should be high enough to allow information to be recorded or erased on or from the disk and sufficient focusing and tracking drive sensitivities. In this modification, a pair of coils are formed by bonding two tracking coils 208T to a focusing coil 207F, respectively. Each of the bonded coils is arranged near the outer flat surface (North pole) of the magnet 103 in parallel thereto.

Figure 6:
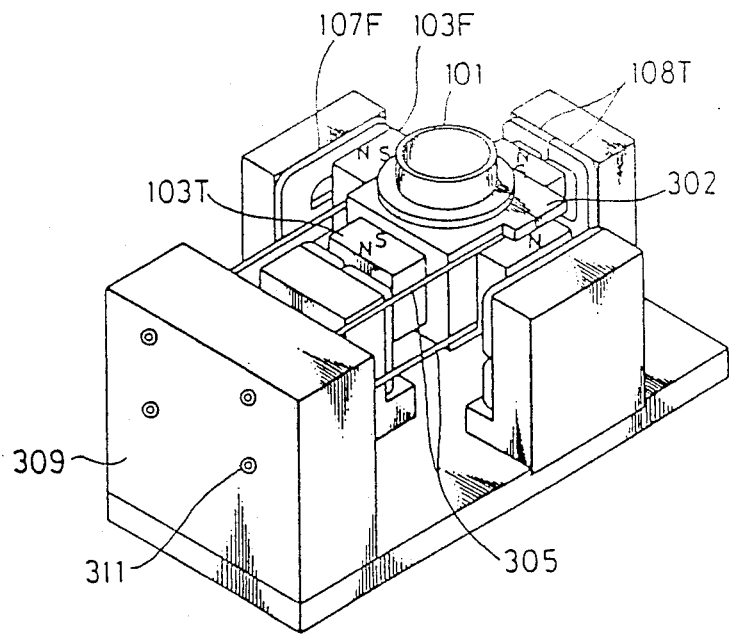
FIG. 6 is a perspective view showing a second modification of the first embodiment.

FIG. 6 shows a second modification of the first embodiment shown in FIG. 3. In this drawing, the mutual positional relationship between the four permanent magnets 103 and four coils 107F and 108T are the same as shown in FIG. 3. The lens holders 302 are movably supported by four metal wires 305 fixed by a wire support block 309, so as to be movable in the axial (focusing) and radial (tracking) directions of the condenser lens 101. Further, a gel material 311 is injected to four holes to which the wires 305 are passed to provide dumping effect of the condenser lens 101. That is, four wires 305 are used to support the condenser lens 101 and the magnets 103 in place of the rubber suspensions 105 shown in FIG. 3.

Figure 7A:
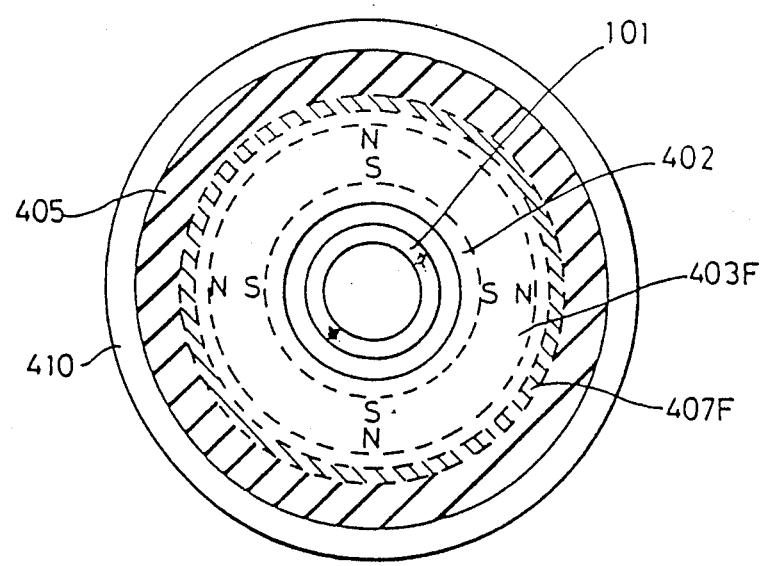
FIG. 7(A) is a top view showing a second embodiment of the head according to the present invention.
Figure 7B:
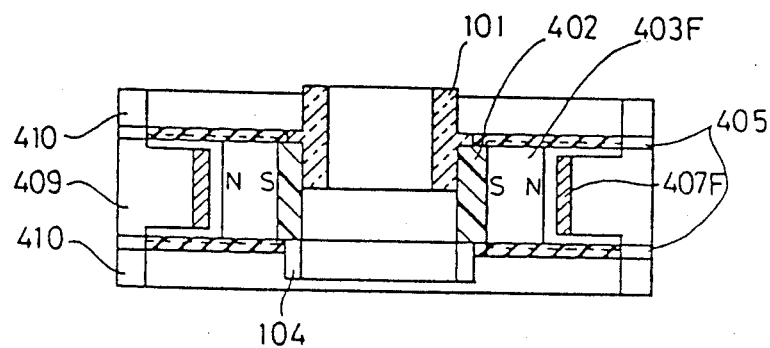
FIG. 7(B) is a side view showing the head shown in FIG. 7(A)

FIGS. 7(A) and (B) show a second embodiment of the magnetooptic head according to the present invention, in which only a single hollow focusing coil 407F is provided. In the drawings, the condenser lens 101 is supported by a cylindrical lens holder 402 made of a non-magnetic material. Further, a hollow permanent magnet 403F is fixed to the cylindrical lens holder 402 coaxially with the optical axis of the condenser lens 101. The cylindrical hollow magnet 403F is magnetized radially from the outer circumference to the inner circumference thereof as shown in FIG. 7. The lens holder 402 and the permanent magnet 403F are movably supported between two annular spring plates 405 for suspending the movable lens 101 and the magnet 403F. The outermost circumference of each of the annular spring plates 405 is fixed between an annular coil fixing frame 409 and one of two outer frames 410.

In this second embodiment, since the condenser lens 101 is moved up and down only in the focusing direction and further, the cylindrical magnet 403F is arranged throughout the outer circumference of the condenser lens 101, it is possible to obtain a strong external magnetic field by means of a relatively small permanent magnet for information recording or erasing operation However, in this second embodiment, no tracking coil is provided.

In the above-mentioned embodiments, it is preferable to dispose high-permeability material such as pure iron near the focusing and tracking coils so as to shield the coils from the outside, extending in the axial direction of the condenser lens, to increase the magnetic flux density at the magnetic gaps, that is, to increase the focusing or tracking drive sensitivity.

As described above, in the magnetooptic head according to the present invention, since the permanent magnets are fixed to the condenser lens so as to be movable relative to the disk, the intensity of external magnetic field applied to the disk is always kept constant in the accompany of the focusing control, thus improving the quality of information signals to be recorded. Further, since the permanent magnets are used only to drive the condenser lens for focusing and operation, the magnetooptic head can be reduced in size and in thickness without magnetic interference with other magnets Furthermore, since the external magnetic field generating means is housed within the magnetooptic head, the disk can be loaded more readily into the disk drive.

Figure 8A:
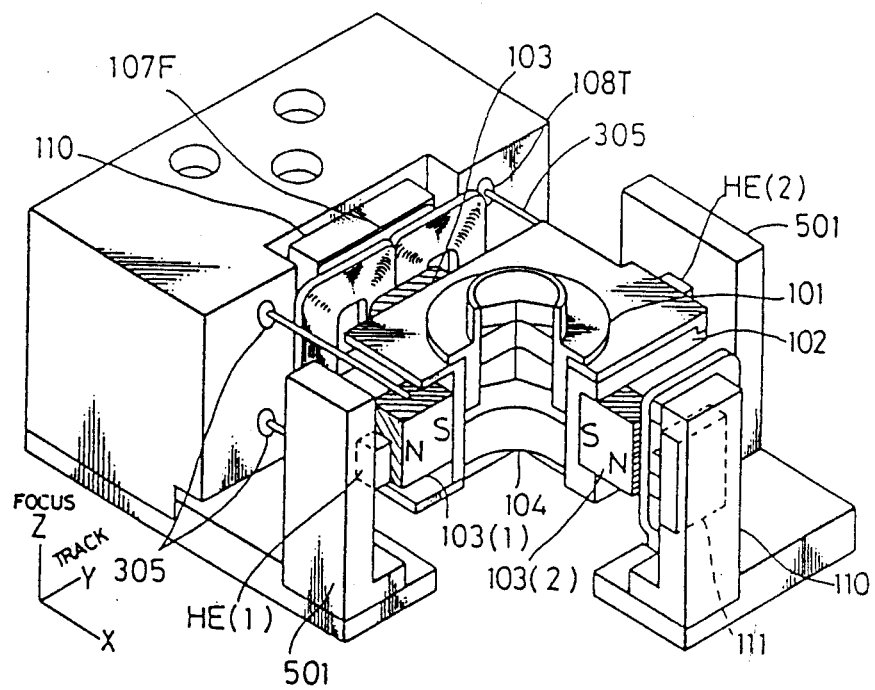
FIG. 8(A) is a perspective view showing a third embodiment of the head according to the present invention.

FIGS. 8(A) and (B) show a third embodiment of the magnetooptic head according to the present invention, in which a pair of Hall elements are arranged to detect the moving direction and the movement distance of the condenser lens from the neutral position in tracking operation.

Figure 8B:
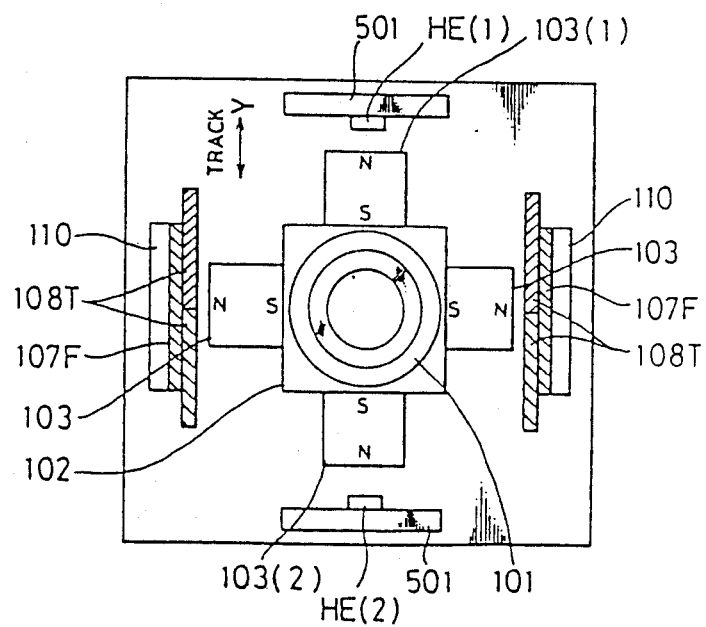
FIG. 8(B) is a top view showing the head shown in FIG. 8(B)

In FIG. 8, the numeral 110 denotes a coil mounting plate to which pure iron plate 111 of high permeability is fitted to increase the magnetic flux density between the magnet and the coil.

Further, two Hall elements HE bonded on two Hall element holders 501 are disposed close to the magnetic pole surfaces (North pole in FIG. 8), respectively, along the tracking direction Y, in order to detect the Y-directional displacement of the condenser lens 101. These Hall elements HE are disposed at the central position of the permanent magnets 103, respectively.

The Hall element HE has four terminals as shown in FIG. 9(A), two of which are voltage supply terminals and the remaining two of which are output terminals for outputting two Hall voltage signals indicative of detected magnetic field intensity. In FIG. 8, two Hall elements HE are disposed so as to face the same North poles of the magnets 103.

FIG. 9(B) show a circuit for detecting the lens position on the basis of the output signals of the two Hall elements HE. A first Hall voltage $e_1$ indicative of a neutral magnetic field position (central N-pole position) of a first magnet 103(1) can be detected by obtaining a differential level of two outputs A and B of a first Hall element HE(1). A second Hall voltage $e_2$ indicative of a neutral magnetic field position (central N-pole position) of a second magnet 103(2) can be detected by obtaining a differential level of two outputs A and B of the second Hall element HE(2). Further, a lens position signal can be generated by further obtaining a differential level of these two Hall voltages $e_1$ and $e_2$.

Further, it is of course possible to detect the condenser lens position by one Hall element and one differential amplifier.

During the tracking operation of the laser beam, when the lens position signal exceeds a predetermined level in voltage level, this signal is applied to an external actuator such as a linear motor to move the whole head, so that the displacement of the condenser lens in the radial tracking direction within the head is reduced by the linear motor into a neutral position of the condenser lens.

Figure 9C:
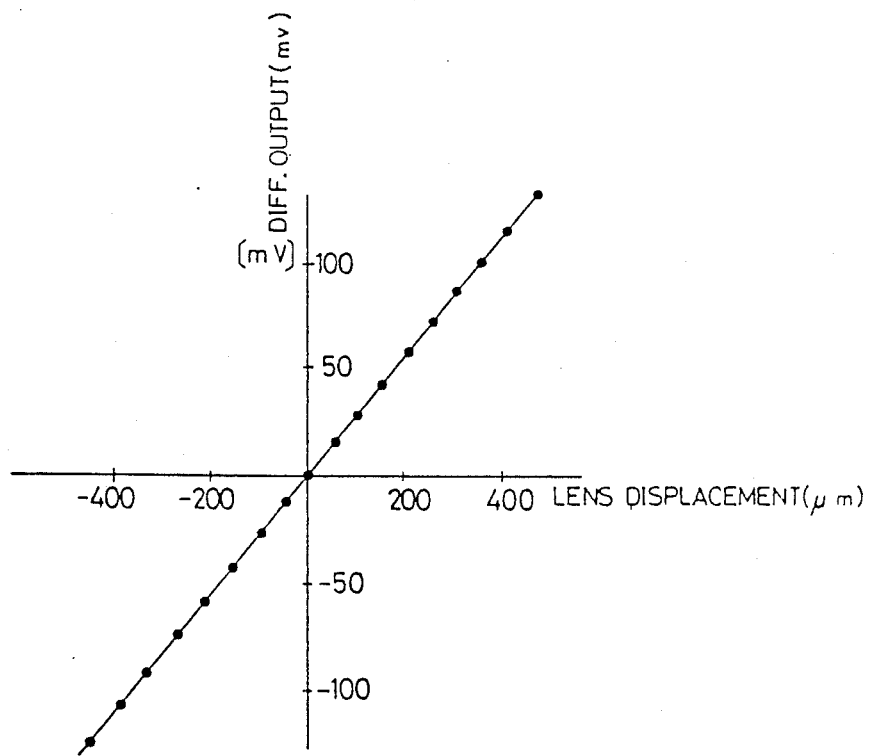
FIG. 9(C) is a graph representing a linear relationship between differential output and lens displacement.

FIG. 9(C) shows the relationship between the differential output and the lens displacement, which indicates an excellent linearity over a tracking movement range of ±400 μm. The detection sensitivity of the above example is about 0.27 mV/μm.

Figure 10:
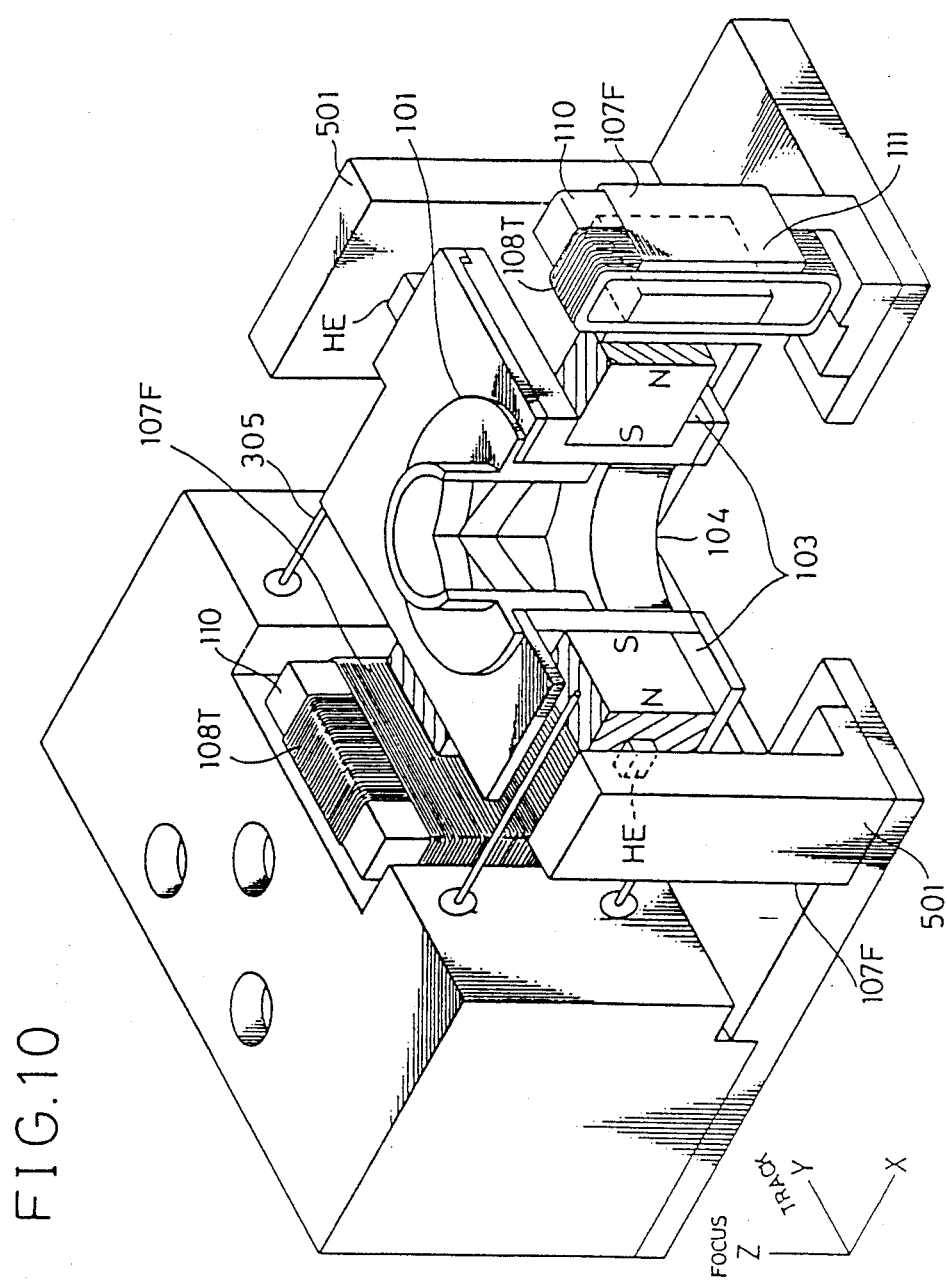
FIG. 10 is a perspective view showing a first modification of the third embodiment.

FIG. 10 shows a first modification of the third embodiment of the head according to the present invention.

In FIG. 8, the focusing and tracking coils are formed into a flat shape, separately. In FIG. 10, however, each tracking coil 108T is wound around a coil mounting plate 110 extending in the axial direction of the lens 101 and additional each focusing coil 107F is wound over the tracking coil 108T extending in the radial direction of the lens 101. Further, two Hall elements HE are fixed to the two Hall element holders 501, respectively, in the same way as in FIG. 8.

Figure 11A:
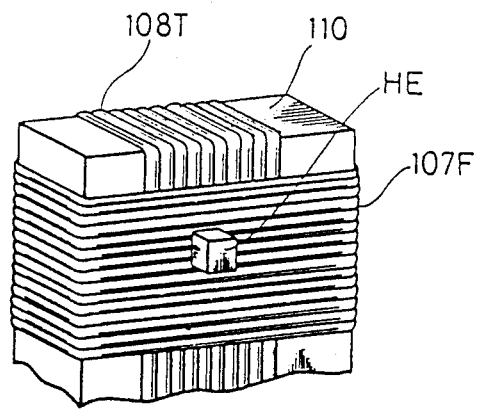
FIG. 11(A) is a perspective view showing a second modification of the third embodiment.
Figure 11B:
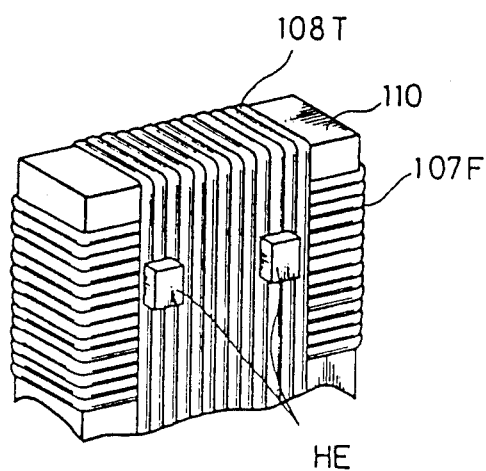
FIG. 11(B) is a perspective view showing a third modification of the third embodiment.

In the above first modification shown in FIG. 10, although the Hall element HE is mounted or each Hall element holder 501, it is possible to fix the Hall element to any fixed elements relative to the movable magnet 103 at such a position as to face the pole surface of the magnet. In practice, the Hall element can be fixed to the coil mounting plate 110 or the tracking coil 108T, as shown in FIG. 11(A). In this case, two Hall elements HE are mounted on two focusing coils 107F, respectively, in the X-direction in FIG. 10. Further, it is also preferable to fix two Hall elements HE on the tracking coil 108T, as shown in FIG. 11(B), a distance spaced away from each other in symmetrical relationship with respect to the pole surface of the magnet 103. In the case shown in FIG. 11(B), the two Hall elements are mounted on either or both of the two focusing coils 107F.

Figure 12A:
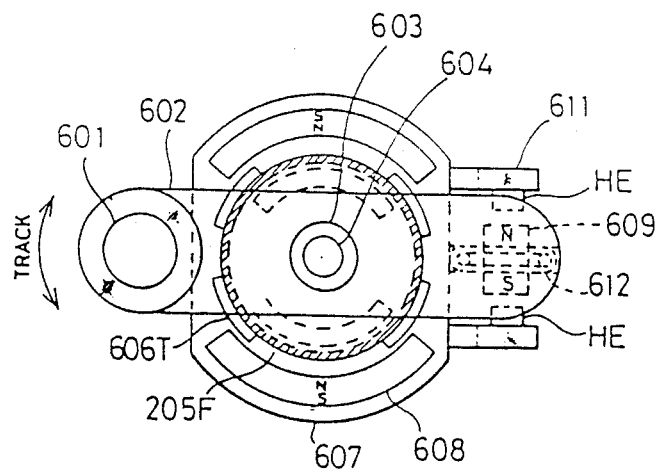
FIG. 12(A) is a top view of an example of head to which the second embodiment is partially adopted.
Figure 12B:
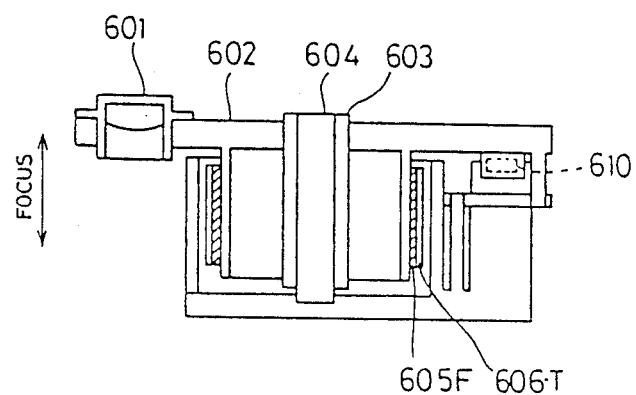
FIG. 12(B) is a side view of the head shown in FIG. 12(A)
Figure 13A:
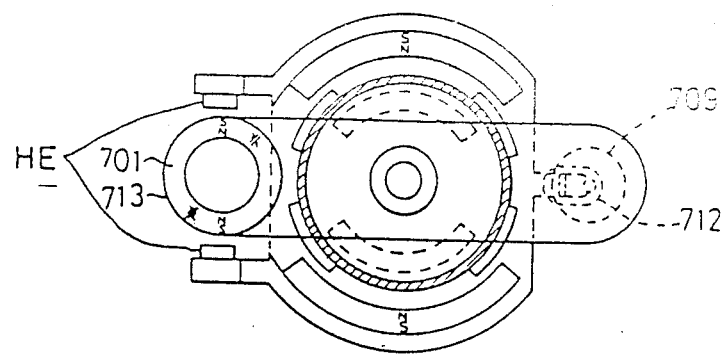
FIG. 13(A) is a top view of another example of head to which the second embodiment is partially adopted.
Figure 13B:
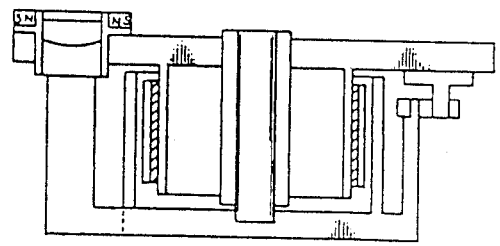
FIG. 13(B) is a side view of the head shown in FIG. 13(A).

FIGS. 12 and 13 show some examples in which the Hall elements are incorporated in a head of axially slidable actuator type.

In FIG. 12(A), a condenser lens 601 is mounted on a non-magnetic lens holder 602. The lens holder 602 is slidably and pivotally supported by a shaft 604 via a cylindrical bearing 603. A cylindrical focus coil 605F and four flat tracking coils 606T are fixed to the lens holder 602. These two coils 605F and 606T are movably disposed between two circular-arc shaped permanent magnets 608 connected by a yoke 607. Therefore, when current is passed through the focus coil 605F, the lens holder 602 is moved up and down in the focus control direction. On the other hand, when current is passed through the tracking coil 606T, the lens holder 602 is pivoted clockwise or counterclockwise in the tracking direction.

Further, other permanent magnets 609 are disposed on the side remote from the lens 601 via a rubber damper 612, as a counterweight for balancing the weight of the condenser lens 601. And, a pair of Hall elements HE are fixed to two Hall element mounting plate 611 so as to face the pole surfaces of the magnets, respectively.

Therefore, a lens position signal can be generated by obtaining a differential signal between two Hall sensor output levels. In this example, the permanent magnets 609 are used in common for the counterweight against the condenser lens 601 and the magnetic field generating elements for the Hall elements for detecting lens position.

FIG. 13(A) shows another example, in which a cylindrical permanent magnet 713 magnetized in the radial direction is fixed on the condenser lens 701 so as to apply magnetic fields to two Hall elements HE to detect the condenser lens position. Further, the numeral 709 denotes a counterweight against the condenser lens 701 and the magnet 713; the numeral 712 denotes a rubber damper. The magnetic field from the magnets 713 is also available as an external magnetic field required to record or erase information to or from the disk.

In the above description, the shape and the magnetization direction of the permanent magnets arranged to detect the position of the condenser lens are not limited to the ones shown in FIGS. 8, 10, 11, 12 and 13. Further, either one of the magnetic poles N and S can be located so as to face the Hall element.

Furthermore, it is possible to use any kind of other magnetic field detecting elements such as magnetic resistance element (the resistance thereof changes according to the intensity of magnetic field), without being limited to Hall element.

The actuator provided with the condenser lens position detecting function according to the present invention is available for laser card reading pickup apparatus as well as the pickup head of read-only, write-once, erasable types, etc.

In any cases where the Hall element detects lens displacement beyond a predetermined value, the lens position signal is outputted. In response to the lens position signal, a linear motor for allowing coarse access of the head to a designated track is actuated and further the tracking actuator of the head is locked by passing a current through the tracking coil for prevention of lens vibrations, so that the head is smoothly fine-adjusted to a designated track immediately after the head has been coarse-adjusted and stopped at near the required track, thus reducing the access time of the head to a track.

Furthermore, in the above description only the permanent magnets have been explained. However, it is possible to use any magnetic field generating means such as electromagnets.

According to the present invention, it is possible to provide a low-priced magnetooptic head provided with condenser lens position detecting function, without providing an additional external lens position detecting apparatus which requires a relatively complicated position adjustment procedure.

The magnetooptic head according to the present invention has the following advantages: (1) even when dynamic axial runout of the disk occurs, since the external magnetic field intensity on the disk will not fluctuate due to laser beam focusing operation, it is possible to stably record or erase information to or from the disk; (2) the permanent magnets mounted on the head are used in common for external field, focus and tracking operations and condenser lens position detection (in cooperation of magnetic field detecting elements); (3) since all the necessary components are housed within head, the head can be minimized in size and thickness; (4) when Hall elements are incorporated in the head, the lens position can be detected for providing a high speed head access to a designated track.

What is claimed is:

1. A magnetooptic head for recording/erasing information on/from a recording medium by irradiating the recording medium with a laser beam within a recording/erasing external magnetic field applied to the recording medium, which comprises:
    (a) a cylindrical condenser lens for focusing the beam on the recording medium;
    (b) a cylindrical hollow permanent magnet fixedly arranged outside said condenser lens coaxially therewith and magnetized radially from a center thereof to an outer circumferential surface thereof; for generating a recording/erasing external magnetic field and focusing actuator magnetic field in a radial direction of said condenser lens on the basis of an axial magnetic flux component thereof;
    (c) a cylindrical focusing coil arranged outside said cylindrical hollow permanent magnet coaxially therewith within the magnetic field generated by said cylindrical hollow permanent magnet for moving said condenser lens and said cylindrical hollow permanent magnets together in the axial direction of the recording medium to provide a focusing servo operation of the laser beam in cooperation with a radial magnetic component of said permanent magnet; and
    (d) an elastic member for movably supporting said condenser lens and said permanent magnet together relative to said focusing coil in the axial direction of said recording medium.

* * * * *